April 7, 1942.  J. P. SPANG  2,279,072
MEAT-SLITTING MACHINE
Filed Jan. 8, 1941  3 Sheets-Sheet 1
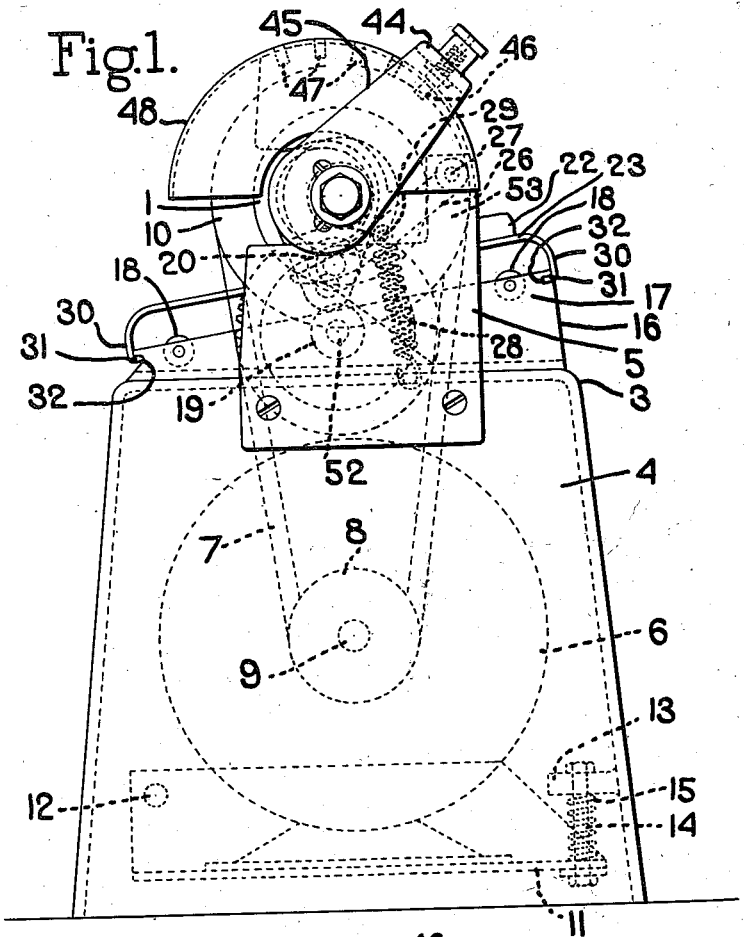
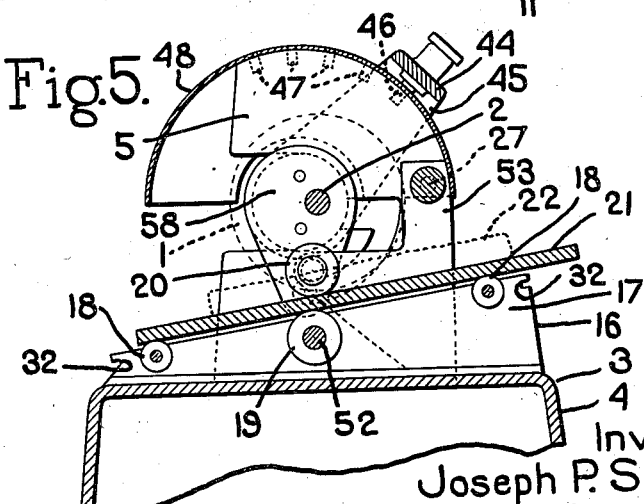
Inventor
Joseph P. Spang
by Heard Smith & Tennant
Attys.

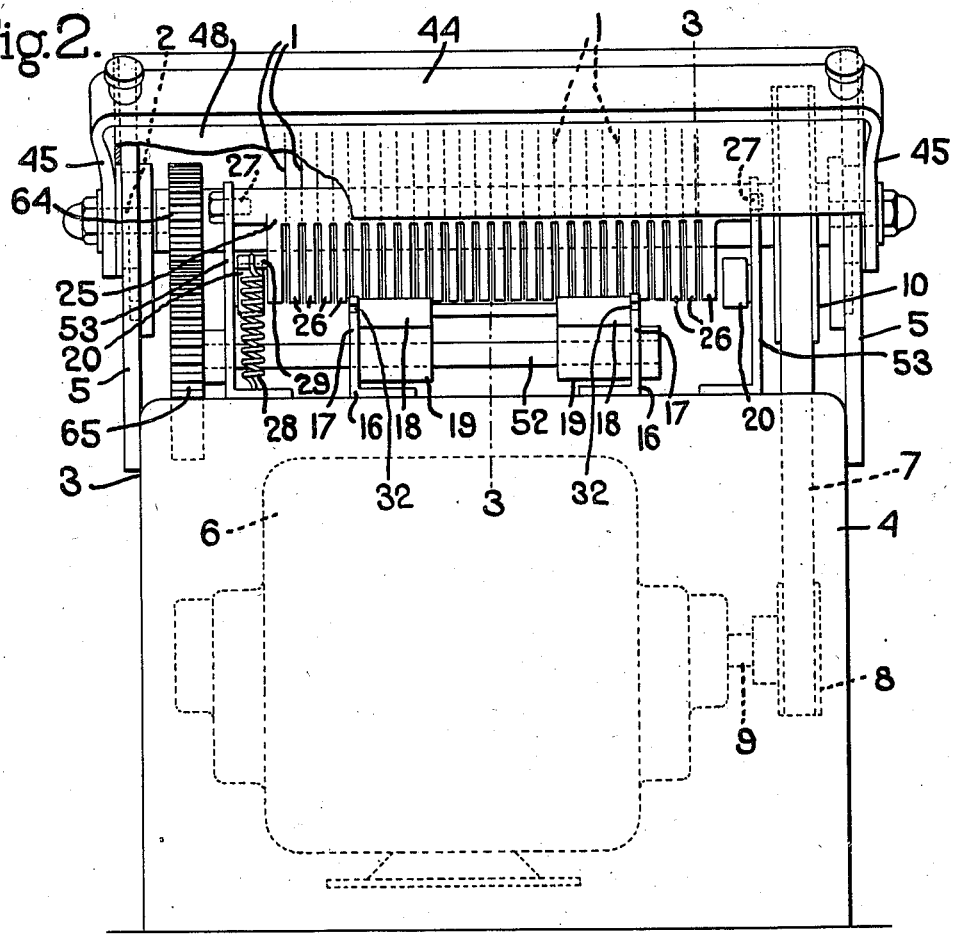
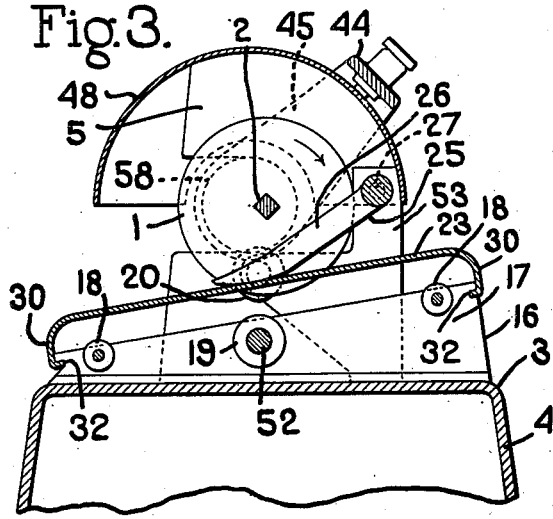
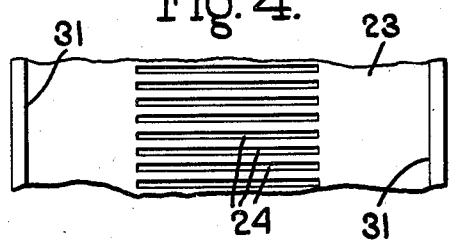

April 7, 1942.    J. P. SPANG    2,279,072
MEAT-SLITTING MACHINE
Filed Jan. 8, 1941    3 Sheets-Sheet 3
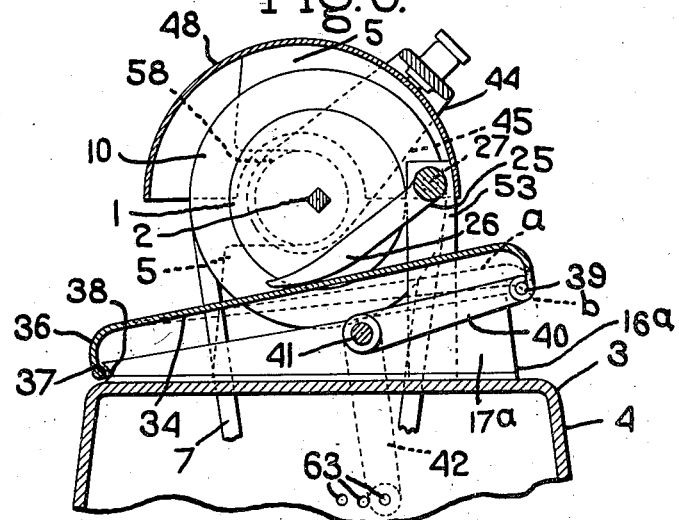
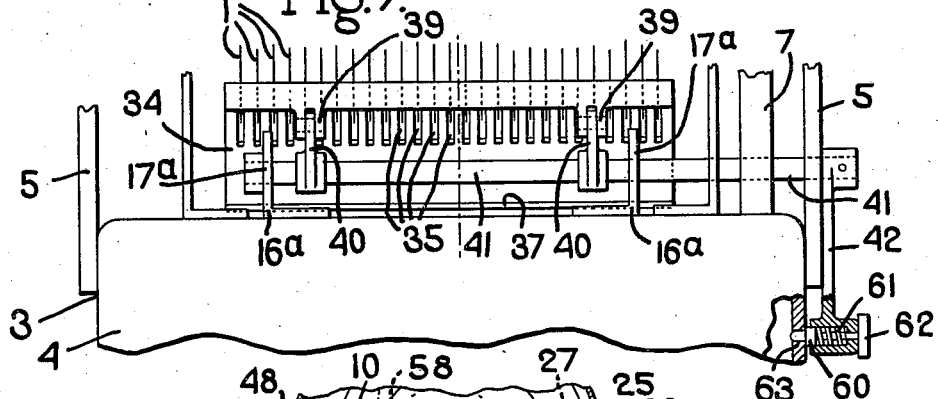
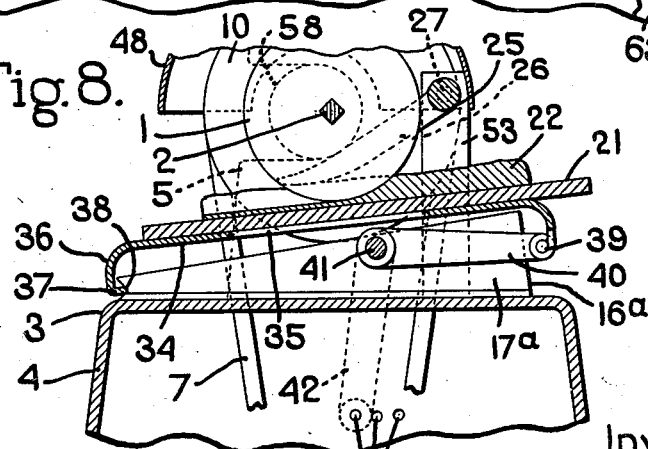
Inventor.
Joseph P. Spang
by Heard Smith & Tennant.
Attys Patented Apr. 7, 1942

2,279,072

UNITED STATES PATENT OFFICE 2,279,072

MEAT-SLITTING MACHINE

Joseph P. Spang, Quincy, Mass., assignor to Cube Steak Machine Company, Inc., Boston, Mass., a corporation of Massachusetts Application January 8, 1941, Serial No. 373,533

7 Claims. (Cl. 146—98)

This invention relates to meat-slitting machines of the known type having a plurality of rotary slitting knives together with means for feeding to said knives the slice of meat to be slit.

In some machines of this type, the slice of meat to be slit is carried through the machine on a free meat-supporting plate which is separable from the machine and which is adapted to be introduced into the machine on one side thereof with an unslit slice thereon, and to be discharged from the machine on the other side thereof with the slit slice thereon.

Such machines are usually so constructed that the knives cut only part way through the slice, thereby leaving a film of uncut meat on the under face of the slice. A machine of this general type is shown in my co-pending application, Serial No. 247,444, filed December 23, 1938.

It is sometimes desirable to so operate the machine that the knives will cut clear through the slice, thereby cutting the slice into strips, and one object of the present invention is to provide a machine such as illustrated in my above-mentioned co-pending application, Serial No. 247,444, with an accessory by which it may be converted from a machine for cutting the slits part way only through the slice to a machine in which the knives cut clear through the slice and thus cut the latter into separate strips.

This object is accomplished by employing a slotted grid member constructed to be mounted on the portion of the machine over which the free plate is fed and which, when assembled with the machine, provides a raised meat-supporting surface extending slightly above the lower edge of the knives, which knives operate in the slots of the grid member. With this arrangement, any slice of meat which is fed over the grid will be cut into separate strips by the knives.

Another object of the invention is to provide a machine such as above described in which the grid member is vertically adjustable relative to the knives, so that by making the proper adjustment of the grid member, the machine may be operated to cut a slice into separate strips or may be operated to cut slits only part way through each slice.

Other objects of the invention are to improve generally meat-slitting machines in the various particulars as will be more fully hereinafter set forth.

In the drawings, wherein I have illustrated some embodiments of the invention:

Fig. 1 is a side view of a machine embodying my invention.

Fig. 2 is an end view thereof with part broken out and the grid omitted.

Fig. 3 is a section on the broken line 3—3, Fig. 2, showing the grid in place.

Fig. 4 is a fragmentary view of the slotted grid member.

Fig. 5 is a section similar to Fig. 2 but showing the machine in the form illustrated in my said co-pending application, Serial No. 247,444.

Fig. 6 is a sectional view similar to Fig. 3 but showing a different form of the invention.

Fig. 7 is a fragmentary view of Fig. 6 looking toward the left.

Fig. 8 is a fragmentary sectional view similar to Fig. 6 but showing the meat-supporting member in one of its adjusted positions.

In the drawings, the rotary slitting knives by which the slits are cut in the slice of meat are indicated at 1. These knives are mounted in spaced relation on a knife shaft 2 which is rotatively mounted in a supporting frame 3. The frame herein shown comprises a hollow base portion 4 having at each end an upright 5 rising above the base portion, the shaft 2 being journaled in said uprights.

The knife shaft may be rotated in any appropriate way and as herein shown, a motor 6 is provided for this purpose which is located within the hollow base 4, said motor being operatively connected with the knife shaft 2 by means of a driving belt 7 which passes around a pulley 8 on the motor shaft 9 and around another pulley 10 on the knife shaft 2.

The motor is shown as supported on a platform 11 which is pivotally mounted in the base at 12. The free edge of the platform is connected to a lug 13 carried by the frame base 4 through the medium of a bolt 14, and a spring 15 is interposed between said lug and the platform, which spring functions to keep the belt 7 under proper tension.

Mounted on the top of the frame base 4 are two angle iron members 16 which provide a support for a free meat-carrying plate 21 by which the slice of meat to be slit is fed through the machine as set forth in my co-pending application, Serial No. 247,444. The upright legs 17 of these angle iron members 16 are shown as supporting two rolls 18 on which such free meat-supporting plate may travel, and there is also shown a feed roll 19 carried on a driven shaft 52 which is journaled in the upright legs 17 of the angle iron member 16, said feed roll serving to control the forward or feeding movement of the meat-supporting plate. 20 indicates presser rolls arranged to engage the upper face of such a meat-supporting plate and to hold it in frictional driving contact with the feed roll 19.

Fig. 5 shows a free meat-supporting plate 21 carrying a slice of meat 22 and being fed through the machine in the manner set forth in my above-mentioned co-pending application, Serial No. 247,444.

The construction shown in Fig. 5 is such that the knives will cut nearly but not quite through the slice 22, thereby leaving a thin uncut film on the bottom face of the slice.

To convert the machine, such as shown in Fig. 5, into one adapted to cut clear through the slice and to cut the latter into strips, I have provided a grid member 23, preferably made of sheet metal, and which is adapted to be supported by the vertical legs 17 of the angle iron members 16 and which is provided with slots 24, one for each of the knives 1. When this grid member is supported on the vertical legs 17 of the angle iron members 16, the upper surface thereof will be situated slightly above the lower edge of the knives 1, and such lower edges of the knives will dip into the slots 24. When, therefore, a slice 22 of meat is placed on the grid 23 and is fed forward, the knives will function to cut the slice into separate strips.

The machine herein shown is provided with a stripper member 25 having fingers 26 that extend between the knives and bear against the slice of meat, said fingers serving not only to prevent the slice from being lifted from the grid by the rotation of the knives but also serving to apply a retarding force to the slice which offsets the tendency of the slice to be fed forwardly too rapidly by the rapidly rotating knives.

The stripper member is pivotally mounted in supporting brackets 53, as shown at 27, and it is acted on by a spring 28 which yieldingly holds it against the meat, one end of said spring being attached to a lug 29 extending from the end finger of the stripper and the other end of the spring being attached to the frame base 4.

The grid member 23 has the down-turned portion 30 at its front and rear edges, and the lower edge of each down-turned portion is bent inwardly to form a lip 31. The upright leg 17 of each angle iron member 16 is formed at each end with a notch 32 to receive one of the lips 31. The grid member is preferably made slightly resilient so that the down-turned portions 30 can be spread sufficiently to enable the lips 31 to be entered into the notches 32, and thereby said grid member will be held in position on the vertical legs 17 of said angle iron member 16.

With the construction shown in Figs. 1 to 5, the grid has a fixed position on the frame, and such a device can only be used for cutting a slice of meat into separate strips. In Figs. 6 to 8, I have shown a modified form of the invention wherein the grid is made adjustable so that it may be adjusted into a position in which the slice of meat will be cut into separate strips or into a position in which the slits formed in the slice of meat will be cut nearly but not entirely through the slice.

In the construction shown in Figs. 6 to 8, the knives 1 and the means for rotating them are the same as that shown in Figs. 1 to 5, and the base portion 4 of the frame has mounted thereon two angle iron members 16a provided with vertical legs 17a.

The grid member in Figs. 6 to 8 is shown at 34, and it is preferably made of sheet metal and is provided with slots 35 in which the knives 1 may operate.

At the delivery side of the machine, this grid member 34 is formed with a down-turned portion 36, the lower edge of which is bent inwardly to form the lip 37 that engages the notches 38 formed in the end of the upright legs 17a. The opposite edge of the grid is pivotally connected at 39 to arms 40 fast on a shaft 41 that is journaled in the upright legs 17a. One end of this shaft 41 extends through an aperture in one of the uprights 5 and is provided with a handle 42 by which the shaft may be turned. The turning movement of the shaft 41 will swing the arms 40 in a vertical direction, thereby swinging the right hand edge of the grid 34 in a vertical direction. During such swinging movement, the grid pivots about the lip 37 which is engaged in the recesses 36, said lip and recesses forming a fulcrum for the grid.

When the shaft 41 has been turned to swing the grid into its raised position, shown in Fig. 6, the knives will dip into the slots 35 and, therefore, any slice 22 of meat which is fed over the grid will be cut into separate strips by the knives.

If the shaft 41 is turned to lower the grid into an intermediate position in which the upper surface of the grid is just below the knives 1, as shown by the dotted line a, Fig. 6, then a slice of meat which is fed over the grid and past the knives will have slits cut nearly but not entirely therethrough, thereby leaving a thin film of unslit meat on the bottom face of the slice.

If the shaft 41 is turned further in a clockwise direction to lower the grid into its low position, shown in dotted lines b in Fig. 6 and in full lines, Fig. 8, then the grid is located a distance below the knives slightly greater than the thickness of the meat-supporting plate 21, and when the grid is adjusted into this position, then the machine may be used to cut slits nearly but not quite through the slice 22 by placing said slice on a free plate 21 and feeding such plate over the lowered grid to cause the meat carried by the plate to be slit by the knives. With the grid in the adjusted position shown in Fig. 8, the knives will cut nearly but not quite through the slice, thereby leaving a film of uncut meat on the bottom face of the slice.

The knife shaft 2 may be journaled directly in the uprights 5, or said knife shaft may be journaled eccentrically in bearing members 58 mounted for turning movement in the uprights. With this construction, turning movement of the bearing members in the uprights 5 will give the knives a vertical adjusting movement.

There is herein provided a bail-shaped member 44, the arms 45 of which are secured to the bearing members 58 so that a swinging movement of the bail-shaped member will turn the bearing members and thus produce the vertical adjustment of the knives. The bail-shaped member is provided with a spring-pressed locking pin 46 adapted to engage in any one of a number of recesses 47 formed in the upright 5, thereby to lock the bail-shaped member in any adjusted position.

The knives are protected by a guard member 48 which is supported on the uprights 5 and which is provided with apertures registering with the recesses 47, so that the engagement of the locking pin 46 in any recess 47 and the aperture of the guard member 48 which registers therewith will serve both to lock the guard member to the uprights and to lock the bail-shaped member in its adjusted position.

I claim:

1. A meat-slitting machine comprising a frame, a set of slitting knives rotatably carried thereby, plate-supporting means beneath the knives adapted to support a removable plate carrying the meat to be slit, a grid of resilient sheet metal adapted to be removably carried by the supporting means and having separable interlocking engagement therewith which is maintained by the resiliency of the grid, said grid providing a meat-supporting surface above the lower edges of the knives and having slots in which the knives operate, whereby the knives will cut into strips a slice of meat fed over the grid, and a stripper element to engage the slice while it is being cut and to hold it against the grid.

2. A meat-slitting machine comprising a frame, a set of slitting knives rotatably carried thereby, plate-supporting means beneath the knives adapted to support a removable plate carrying the meat to be slit, said supporting means having notches in its end, and a removable sheet metal grid carried by the supporting means and having lips to removably engage in said notches, said sheet metal grid having sufficient resiliency to permit the lips to be snapped into and withdrawn from the notches, and when in operative position providing a meat-supporting surface above the lower edges of the knives, said grid also being provided with slots in which the knives operate, whereby the knives will cut into strips a slice of meat as it is fed over the grid.

3. A meat-slitting machine comprising a frame having a base portion and uprights at each end thereof, rotary slitting knives mounted in the uprights, upstanding flanges separate from said uprights and mounted on the base beneath the knives, a sheet metal grid member removably carried by the upstanding flanges and having a separable interlocking engagement therewith, said grid member providing a meat-supporting surface above the lower edges of the knives and having slots in which the knives operate, whereby the knives will cut into strips a slice of meat fed over the grid, and a stripper element to engage the slice while it is being cut and to hold it against the grid.

4. A meat-slitting machine comprising a frame having a base portion and uprights at each end thereof, rotary slitting knives mounted in said uprights, upstanding flanges rising from the base beneath the knives and constituting a plate-supporting means for supporting a removable plate carrying a slice of meat to be slit, said flanges having notches at their ends, and a removable sheet metal grid carried by said flanges and having lips to removably engage said notches, said grid providing a meat-supporting surface above the lower edge of the knives and also being provided with slots in which the knives operate, whereby the knives will cut into strips a slice of meat as it is fed over the grid.

5. A meat-slitting machine comprising a frame having a base portion and uprights at each end thereof, rotary slitting knives journaled in said uprights, upstanding flanges rising from the base beneath the knives, each flange having a notch in one end, a grid member having on one edge a down-turned portion provided with an in-turned lip to engage in said notches, said grid member providing means for supporting a slice of meat as it is fed to and delivered from the knives, and means cooperating with the opposite edge of said grid member to swing the latter in a vertical direction about the in-turned lip as a fulcrum.

6. A meat-slitting machine comprising a frame having a base portion and uprights at each end thereof, rotary slitting knives journaled in said uprights, upstanding flanges rising from the base beneath the knives, each flange having a notch in one end, a grid member having on one edge a down-turned portion provided with an in-turned lip to engage in said notches, said grid member providing means for supporting a slice of meat as it is fed to and delivered from the knives, a shaft rotatably mounted in said flanges, arms fast on said shaft, means pivotally connecting said arms to the opposite edge of the grid, and means to turn the shaft, thereby to give the grid a swinging movement toward and from the knives about said in-turned lip as a fulcrum.

7. A meat-slitting machine comprising a frame, a set of rotary slitting knives mounted therein, a sheet metal grid-like meat-supporting member having a flat upper face constituting the entire supporting surface for the meat as it is fed to and delivered from the knives, said member having slots, one for each of the knives, and means to swing said member vertically about one edge thereof from a position in which the lower edges of the knives operate in said slots and meat fed over the plate will thus be cut into strips, into a position in which the meat-supporting member is below the lower edge of the knives and a slice of meat fed thereover will have slits cut part way but not entirely therethrough.

JOSEPH P. SPANG.